Figure 1:
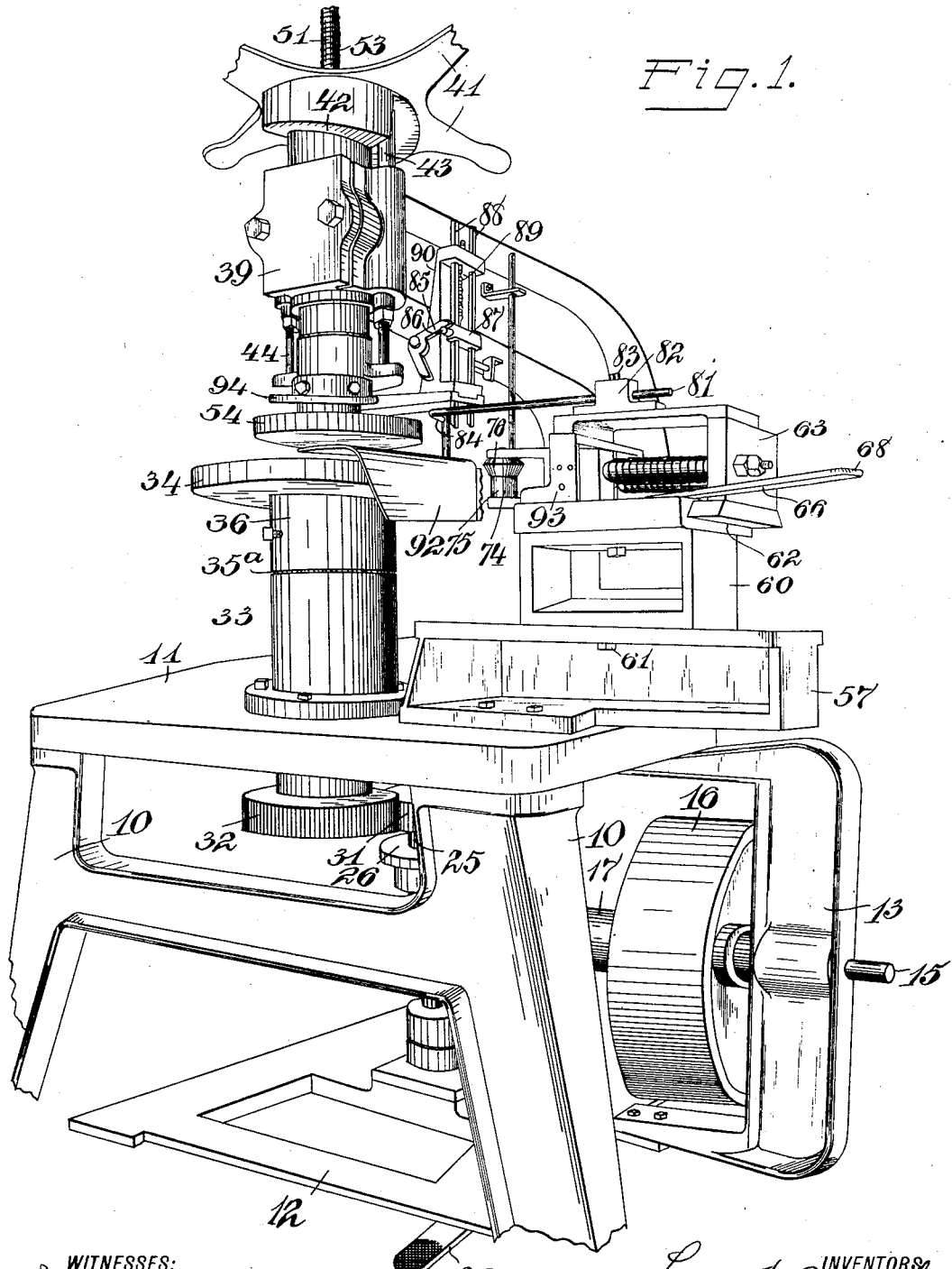

L. F. BRASCH & A. C. TEANY.
MACHINE FOR MAKING CUP SHAPED ARTICLES.
APPLICATION FILED JUNE 8, 1911.

1,033,300.

Patented July 23, 1912.

5 SHEETS—SHEET 1.

L. F. BRASCH & A. C. TEANY.
MACHINE FOR MAKING CUP SHAPED ARTICLES.
APPLICATION FILED JUNE 8, 1911.

1,033,300.

Patented July 23, 1912.

L. F. BRASCH & A. C. TEANY.
MACHINE FOR MAKING CUP SHAPED ARTICLES.
APPLICATION FILED JUNE 8, 1911.

1,033,300.

Patented July 23, 1912.

5 SHEETS—SHEET 3.

L. F. BRASCH & A. C. TEANY.
MACHINE FOR MAKING CUP SHAPED ARTICLES.
APPLICATION FILED JUNE 8, 1911.
1,033,300.
Patented July 23, 1912.
5 SHEETS—SHEET 4.
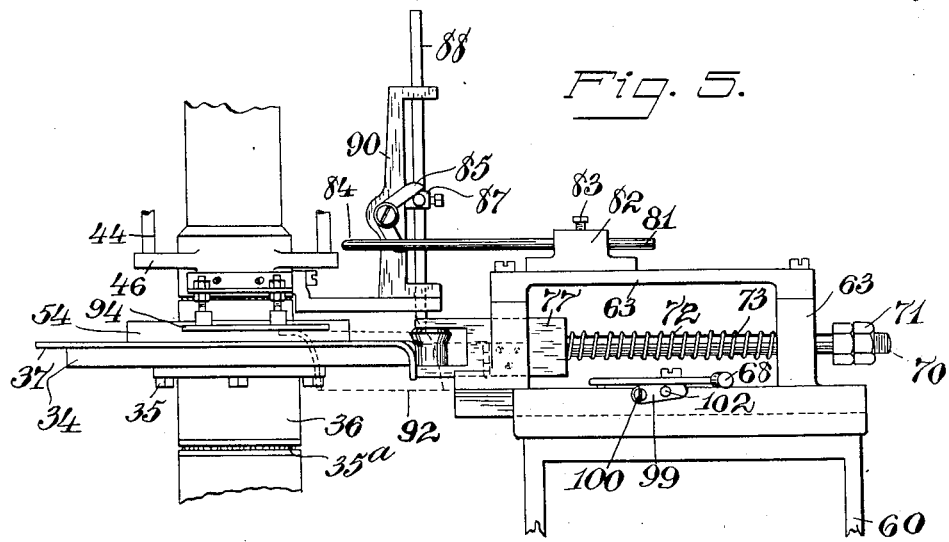
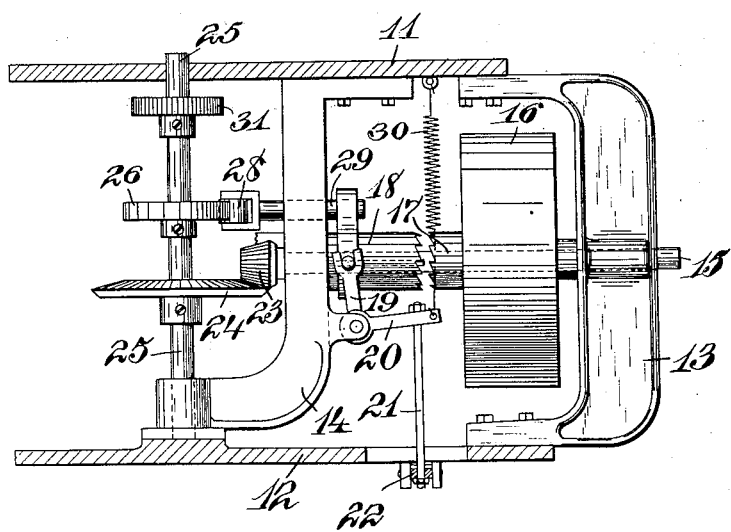

L. F. BRASCH & A. C. TEANY.
MACHINE FOR MAKING CUP SHAPED ARTICLES.
APPLICATION FILED JUNE 8, 1911.

1,033,300.

Patented July 23, 1912.
5 SHEETS—SHEET 5.

Witnesses:
John C. Kopf
M. A. Johnson

Inventors
Louis F. Brasch, and
Arthur C. Teany
By their Attorneys
Wm. H. Campbell

UNITED STATES PATENT OFFICE.

LOUIS F. BRASCH, OF NEWARK, AND ARTHUR C. TEANY, OF EAST ORANGE, NEW JERSEY.

MACHINE FOR MAKING CUP-SHAPED ARTICLES.

1,033,300.

Specification of Letters Patent. Patented July 23, 1912.

Application filed June 8, 1911. Serial No. 632,000.

*To all whom it may concern:*

Be it known that we, LOUIS F. BRASCH and ARTHUR C. TEANY, citizens of the United States, residing, respectively, at Newark and East Orange, in the county of Essex and State of New Jersey, have invented certain new and useful Improvements in Machines for Making Cup-Shaped Articles; and we do hereby declare the following to be a full, clear, and exact description of the invention, such as will enable others skilled in the art to which it appertains to make and use the same, reference being had to the accompanying drawings, and to figures of reference marked thereon, which form a part of this specification.

This invention relates to a machine for forming box-ends and lids and similar shaped structures of card-board, that is, structures of a cup-shape, and forming these structures from one sheet of material by clamping the sheet to form an end-piece by turning down the side edges by holding down one side of the material and then rotating the sheet of material so as to roll the edge or rim so that successive folds are formed due to the natural wrinkling or creasing of the paper or similar material, and cutting off the surplus material at the folded part of the rim so as to form an edge that is neat.

The cover that is adapted to be made on this machine is particularly described and illustrated in an application for Letters Patent filed September 14, 1910, Serial No. 581,956, and the machine herein described and illustrated is adapted to form these box-ends or lids and similar structures quickly and economically and provide a machine that when once started on a box-end operates continuously to form the box-end, and when the box-end is complete the machine is automatically stopped so that the box-end can be taken from the clamping means and a new sheet of material inserted for the next box-end.

The invention is illustrated in the accompanying drawings, in which—

Figure 2:
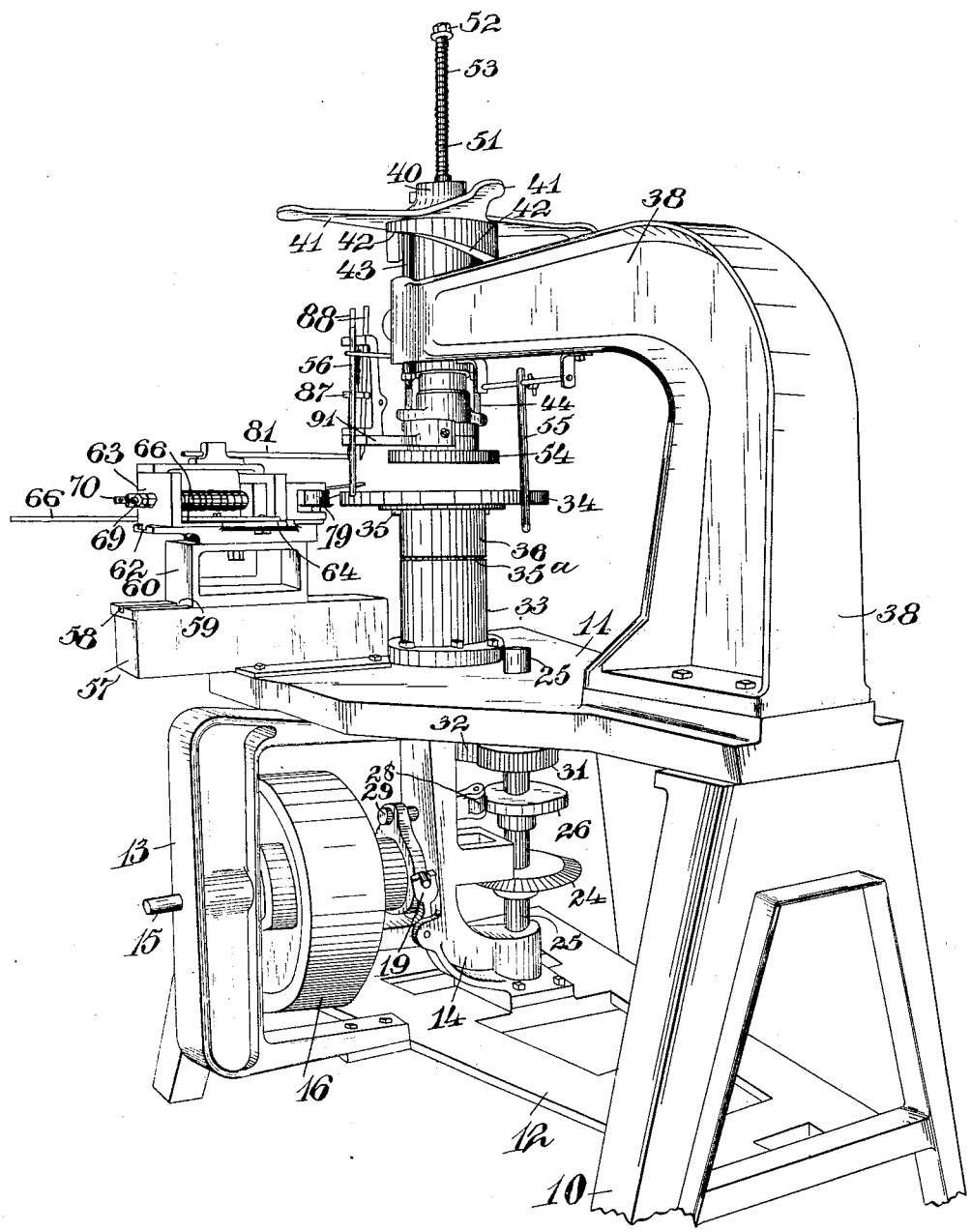
Figure 3:
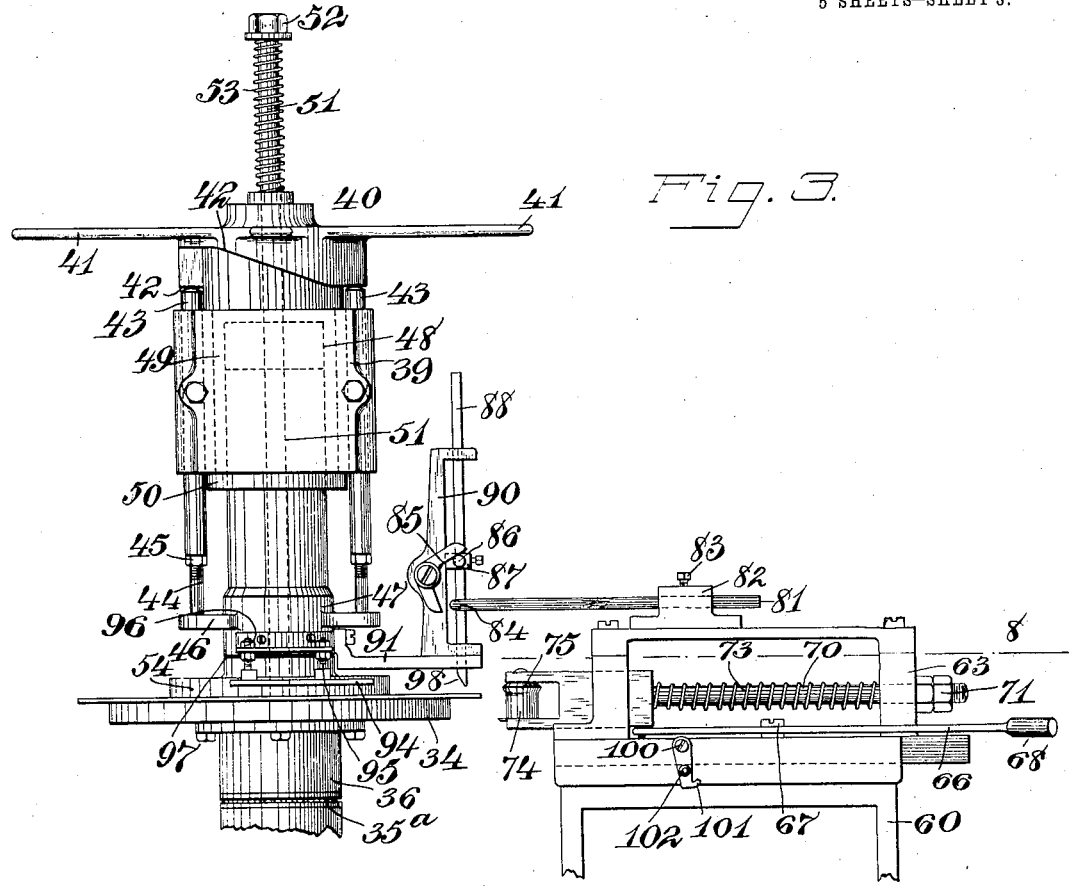
Figure 4:
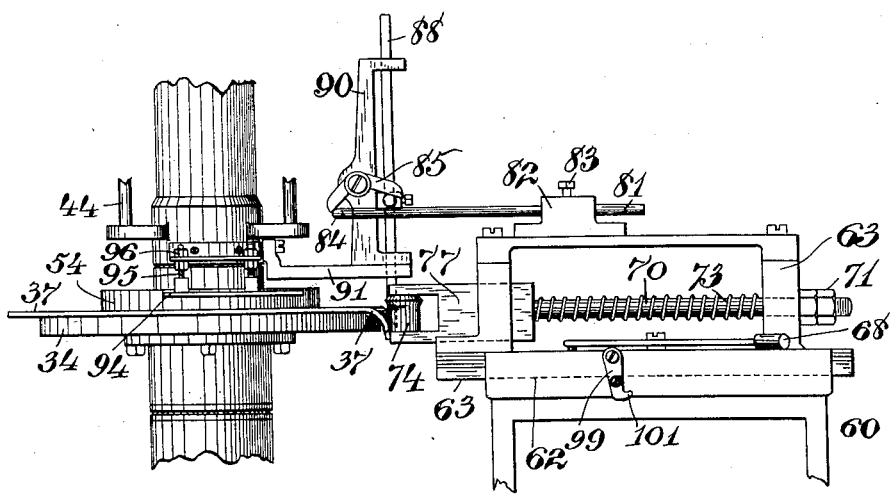
Figure 7:
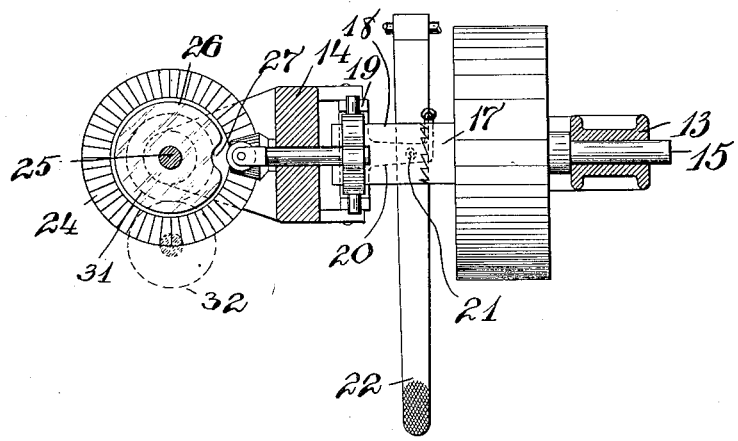
Figure 8:
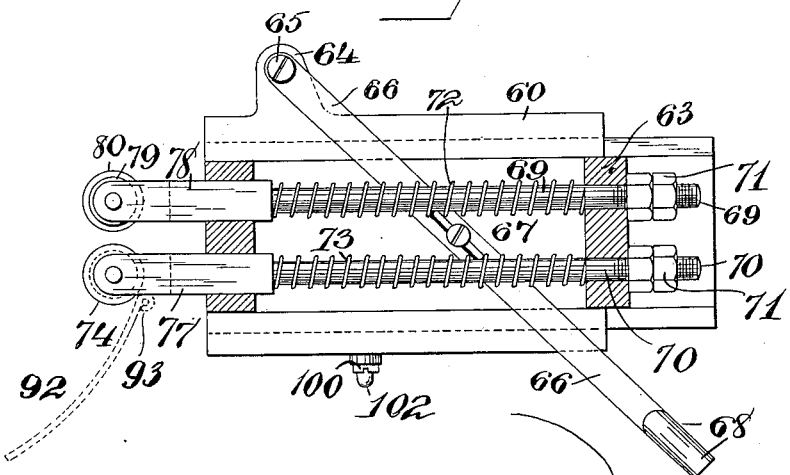
Figure 9:
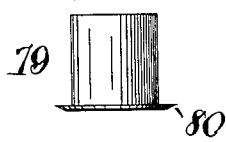
Figure 10:
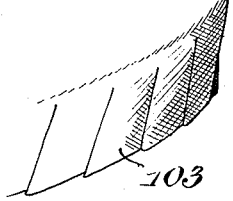
Figure 11:
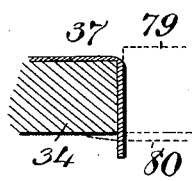

Figure 1 is a perspective view taken from the front with the base of the machine broken away. Fig. 2 is a perspective view taken from the rear. Fig. 3 is a front view of the clamping and rolling mechanism with a sheet of material in place before it is en- gaged by the rolling or turning-down mechanism. Fig. 4 is a view similar to Fig. 3 with the material of the box-end turned down and with the roller and knife in place. Fig. 5 is a view similar to Fig. 4 with the roller and knife locked in place and with the turning-down mechanism being returned to its normal position. Fig. 6 is a front view of the clutch mechanism which provides for a single rotation of the machine. Fig. 7 is a horizontal section taken through Fig. 6. Fig. 8 is a horizontal section of the carriage carrying the rolling and cutting mechanism, said section being taken on line 8, in Fig. 3. Fig. 9 is a side view of the cutter. Fig. 10 is a perspectve of part of a box-end or cover after it is taken from the machine, and Fig. 11 is a section showing the cutter in dotted outline and illustrating its coaction with the bottom of the platen that supports the sheet of material being formed in the act of cutting.

The machine comprises a suitable base 10 which can be of any suitable configuration and is provided with a table 11 and a base-plate 12. A bracket 13 and a frame 14 support the driving-shaft 15 on which is mounted a pulley 16 which is adapted to be connected up with a belt to drive the machine, although other driving means can be employed. The pulley 16 is loose on the shaft 15 and is connected with one member 17 of a clutch, the other member 18 of the clutch sliding on the shaft 15, but being fixed to the shaft so that when the member 18 of the clutch is rotated, that is, when the clutch is thrown in operative connection, the shaft is forced to rotate. The member 18 of the clutch is operated manually by means of a fork 19 on a bell-crank 20 which is pulled down by a rod 21 when the foot-treadle or lever 22 is pressed down by the foot. When this treadle is pushed down the fork 19 pushes the member 18 of the clutch against the member 17 and the teeth on the opposed faces of the members are brought in contact as shown in Fig. 7, and the miter-gear 23 engages the gear 24 and the countershaft 25, on which countershaft is mounted a cam 26, and when the countershaft 25 has rotated one revolution, which is sufficient to drive the machine far enough to form one complete device on the machine, as will be hereinafter described, a recess 27 in the cam permits the roller 28 on the rod 29 to be forced in, due to the normal action of the spring 30 bearing on the bell-crank 20 to force the clutch members apart and the machine is automatically stopped. On the countershaft 25 is a gear 31 which is in mesh with a gear 32, which gear is secured on a shaft which extends up through the bearing 33 and is connected to a rotating platen 34, suitable ball-bearings 35ª making the rotation of this platen 34 easy. The platen 34 is removable preferably by means of the bolt 35 and the collar 36, which collar is in turn secured to the shaft on which the gear 32 is arranged. This platen is made removable because it is easily changed when a different size of box-end or cover is to be made, and thus a wide scope for different sizes is presented, as will be understood.

The blank 37, which consists of a sheet of material and in most cases is cardboard, is laid on the platen 34, and we usually use rectangular blanks, although any shape can be used as long as sufficient material is provided for permitting the turned-down portion to form the rim of the cover or box-end.

We intend to use this machine principally for the manufacture of box-covers, and this specification will describe the product of the machine as the cover.

Mounted on the table 11 is an arm 38 which is provided on its end with a bearing 39 in which is rotatably arranged a cam 40, which cam has arms 41 for turning the end which has the cam faces 42, the cam faces being adapted to bear on the stems 43 which slide in the bearing 39 and have extensions 44 and nuts 45 for their adjustment, the extensions being fastened to the wings 46, which wings are in turn fastened to the plunger 47 which extends up in the recess 48 of the portion 49 of the cam 40 which extends down in the bearing, the portion 49 having a collar 50 on the bottom side of the bearing to take up the thrust induced by the turning of the cam 40. A rod 51 with an adjusting nut 52 thereon, which adjusting nut abuts on a spring 53, the other end of the spring abutting on the top of the cam, passes down through the cam and through the plunger 47 and is fastened to the clamping-plate 54. In Figs. 1 and 2 the cam-plate is turned to permit the stems 43 to ride up against the recessed portion of each cam face 42, and the spring 53, through the stem 51, acts to raise the clamping-plate 54 and the plunger 47 with the stems 43, and room is provided for the insertion of a sheet of material 37 to form a cover. The material is quickly centered by letting its back edge bear against the adjustable guide-rod 55, and one of its side edges bear against the adjustable guide-rod 56.

On the table 11 is a block 57 which is slotted at 58 to receive a rib 59 of a frame 60, a suitable bolt 61 clamping the frame in adjusted position on the block so as to provide for its distance from the clamping mechanism of the cover, and thus provide for an approximate adjustment, particularly when different size covers are made and a different sized platen 34 is put into the machine. On the frame 60 is a groove 62 which is preferably of a dove-tailed type, and in which slides a carriage 63. A lug 64 on the frame acts for the pivotal attachment 65 of a lever 66, which lever 66 is attached as at 67 to the carriage and has a free operating end 68, which free end acts as a handle. When the arm or lever 66 is swung forward the carriage is pushed toward the platen. The carriage carries a pair of rods 69 and 70, each of which passes through the front and rear wall of the carriage, and each one is adjustable by having its ends screw-threaded, each rod having adjustable nuts 71 secured thereon to limit the forward movement of said rods induced by the springs 72 and 73, respectively. The projecting end of the rod 70 is provided with a roller 74, the diameter of the lower part 75 of the roller 74 being smaller than the upper part 76 of the roller, the roller being held in a fork 77 on the end of the rod 70. A fork 78 on the rod 69 supports a roller 79 which has a knife 80 at the bottom thereof, which knife co-acts with the bottom edge of the platen 34 as shown in Fig. 11 to cut off excess material from the turned down rim.

When the carriage 63 is moved forward it carries with it a rod 81 which is adjustable in the block 82 on the top of the carriage, being held in place by a suitable set-screw 83. When the carriage is moved forward this rod 81 has its end 84 forced against a latch 85, the latch being free to swing in a reverse direction, and when pushed by the rod 81 in a forward direction, presses down on a pin 86 on a yoke 87, which yoke 87 is fastened to the two rods 88 which slide together on account of being secured to the yoke and are normally held upward by a spring 89. The rods 88 slide in a standard 90 which is fastened to a plate 91. The plate 91 is fastened to the plunger 47 and rises and falls therewith. A curler and guide 92 is fastened at the point 93 or any other suitable point on the carriage 63, and when the carriage is moved forward this curler and guide bears against the edge of the strip or sheet of material 37 and gives it its first tendency to be turned down as it is rotated. A fender 94 is adjustable by means of the bolts 95 and the nuts 96 being secured to the end of the plunger 47 and acting to prevent upward buckling of the sheet 37 when it is engaged by the curling and guiding-plate 92.

The operation of the machine is as follows: with all the parts in the position shown in Fig. 1. A sheet of material is inserted on the platen and is arranged to abut against the guides 55 and 56, then the arms 41 are rotated and the cam with its cam faces 42 forces the stems 43 downward so that the clamping-plate 54 holds the sheet 37 down against the platen 34 so as to insure its rotation with the platen and with the clamping-plate. The clamping-plate 54 is rotatably arranged on the end of the plunger 47, its easy rotation being insured by suitable ball-bearings 97, then the operator grasps the handle 68 and swings the lever 66 forward which carries the carriage 63 with it. The curling and guiding-plate 92 turns down the end or rim of the cover to be formed from the sheet of material 37. At the same time the end 84 of the rod 81 forces the latch 85 to push down the two rods 88, these rods engaging the edge of the cover to form the rim on each side of the roller 79 and forces this material down flat against the side of the platen as shown in Fig. 4, this being done through the beveled or oblique faces 98 of these rods 88, and the roller 79 engages a perfectly flat rim and is held tightly in place by the action of the spring which has been slightly compressed when the carriage is moved forward and the roller is in tight contact, the lever 66 having in the meantime been locked shut by the catch 99 pivoted at 100 on the carriage 63 and having a nose 101 to engage the edge of the lever 66. A handle 102 provides for the swinging of the lever by hand. The roller 74 with its smaller diameter at the bottom also engages the turned-over rim, and by its smaller diameter at the bottom does not give such a strong pressure where the folds 103 (Fig. 10) come in the material so that when the sheet 37 is revolved, as hereinafter described, the change from a flat disk as shown in Fig. 3 to the turned-over rim shown in Fig. 1 is gradual, being slightly turned first by its engagement with the guiding-plate 92 and having its creases or folds formed by the roller 74 into a substantially sharp angle placed at the juncture of the end-piece and the rim of the cover, and then rolled flat by the roller 79 and the surplus material on the edge cut off by the knife 80, acting in conjunction with the bottom surface of the platen 34. The movement of the rods 88 induced by the engagement of the end of the rod 81 with the latch 85 bends down the rim of the cover just before it is engaged by the roller 79 and the knife 80, and the further movement of the carriage induced by the lever 66 causes the spring 73 to be compressed, shown in Fig. 3, and the end of the rod 81 has been carried beyond the latch 85 and the spring 89 returns the rods 88 to their normal positions as shown in Fig. 5. The treadle 22 is now pushed down by the operator and the clutch members 17 and 18 are forced together, the countershaft 35 is rotated, and through the gears 31 and 32 it rotates the shaft on which the platen 34 is mounted. The platen and the clamping-plate 54, along with the sheet of material 37, are rotated one turn, the material as above described being fed under the guiding-plate 92 and past the rollers, the rollers being rotated by the frictional contact against the material from which the cover is being made. The buckling of the material which is induced by its contact with the guiding-plate 92 is prevented by the fender 94 which prevents the cardboard from rising up. When the cover has been made by one rotation of the platen 34 the machine automatically stops by the action of the cam 26 acting on the rod 29 to permit the clutch members to be forced apart. The handles 41 of the cam 40 are then turned sufficiently to allow the spring 53 to snap the stems 43 along with the plunger 47 and the clamping-plate 54 upward, and the cover can then be lifted from the platen and removed from the machine and another sheet of cardboard inserted for the manufacture of another cover.

The machine is simple and by test we have found that its operation is assured, a machine to successively engage cardboard to form it into folds on its rim and then cut these folds even, utilizes the natural creasing of the material, compresses it in a narrow scope, does away with the necessity of scoring the material before it is folded, and makes a stiff one-piece cup-shaped article of cardboard, as will be evident.

Having thus described our invention, what we claim is:—

1. A machine for forming one-piece cup-shaped articles consisting of a platen, a clamping means for holding a sheet of material on the platen, means for engaging one point of the material beyond the platen and folding it against the platen, means for progressing the folding means around the entire platen to fold all the edges into natural creases, and a cutter acting to shear against the edge of the platen for trimming the folded edges of the sheet.

2. A machine for forming one-piece cup-shaped articles consisting of a clamping mechanism adapted to grasp a sheet of material, the sheet of material being larger than the clamping surface of the clamping mechanism, means for bending the excess material at the edge of the sheet down against the folding mechanism at one point of its surface, means for rotating the clamping mechanism with its sheet, means for successively engaging the edges of the sheet for causing the sheet to fold its natural creases, co-acting means on the last-mentioned means and the bending means for causing the disengagement of the bending means from the edge of the sheet of material, and cutting means for trimming the folded edges of the sheet.

3. A machine for forming one-piece cup-shaped articles consisting of a platen, a clamping plate movable toward and from the face of the platen, means for operating the clamping plate, a bending device adapted to force a sheet of material held on the platen and by the clamping mechanism against the edge of the platen, a sliding carriage, folding means on the carriage, cutting means on the carriage, and means for operating the carriage toward and from the edge of the platen.

4. A machine for forming one-piece cup-shaped articles consisting of a platen, a clamping plate movable toward and from the face of the platen, means for operating the clamping plate, a bending device adapted to force a sheet of material held on the platen and by the clamping mechanism against the edge of the platen, a sliding carriage, folding means on the carriage, cutting means on the carriage, means for operating the carriage toward and from the edge of the platen, and means on the carriage for forcing the bending means in engagement with the sheet of material before the folding and the cutting means engage said edge.

5. A machine for forming one-piece cup-shaped articles consisting of a platen, a clamping plate movable toward and from the platen and adapted to be rotated therewith, means for rotating the platen, a bending means secured to and movable on the clamping means, means for forcing the clamping means toward the platen, a sliding carriage, means projecting from the carriage and in operative relation with the bending means when the clamping plate is forced to its clamping position, folding means on the carriage, cutting means on the carriage, and means for moving the carriage toward and from the edge of the platen.

6. A machine for forming one-piece cup-shaped articles consisting of a platen, a clamping plate movable toward and from the platen and adapted to be rotated therewith, means for rotating the platen, a bending means secured to and movable on the clamping means, means for forcing the clamping means toward the platen, a sliding carriage, means projecting from the carriage and in operative relation with the bending means when the clamping plate is forced to its clamping position, folding means on the carriage, cutting means on the cariage, springs adapted to bear on the folding means and the cutting means when the said means are pressed against the edge of the platen, and means for moving the carriage toward and from the platen.

7. A machine for forming one-piece cup-shaped articles consisting of a platen, a clamping plate, means for forcing the clamping plate toward and from the platen, adjusting means between the clamping plate and its operating mechanism, the clamping plate being rotatably mounted on its operating mechanism, a bending means mounted on the operating mechanism of the clamping plate and movable therewith, a sliding carriage, means for forcing the sliding carriage toward and from the platen, means on the sliding carriage for forcing the bending means down at the edge of a strip of material held between the platen and the clamping plate, a folding means and a cutting means on the sliding carriage and adapted to be placed against the material at the edge of the platen, and means for rotating the platen for causing the engagement of the portions of the edge of the sheet of material successively by the folding means and the cutting means.

8. A machine for forming one-piece cup-shaped articles consisting of a table, an arm projecting from the table, a platen rotatably mounted on the table, a clamping plate above the platen, the clamping plate being rotatably mounted on the arm, means for forcing the clamping plate toward and from the platen, a sliding carriage on the table, a folding roller yieldingly mounted on the carriage, a knife yieldingly mounted on the carriage, the knife being adapted to coöperate with the edge of the platen for cutting material, a bending means, means on the carriage for operating the bending means when the carriage is slid forward and before the folding roller and the cutter have engaged the edge of the platen, and means for forcing the carriage toward and from the platen.

9. A machine for forming one-piece cup-shaped articles consisting of a table, an arm projecting from the table, a platen rotatably mounted on the table, a clamping plate above the platen, the clamping plate being rotatably mounted on the arm, means for forcing the clamping plate toward and from the platen, a sliding carriage on the table, a folding roller yieldingly mounted on the carriage, a knife yieldingly mounted on the carriage, the knife being adapted to coöperate with the edge of the platen for cutting material, a bending means, means on the carriage for operating the bending means when the carriage is slid forward and before the folding roller and the cutter have engaged the edge of the platen, a guiding plate secured to the carriage and adapted to engage the edge of a sheet of material held between the platen and the clamping plate to fold it down toward the platen, and means for forcing the carriage toward and from the platen.

10. A machine for forming one-piece cup-shaped articles consisting of a platen, a clamping means for holding a sheet of material on the platen, the sheet of material being larger than the platen, means for forcing the material beyond the edge of the platen down against the side of the platen at one point and engaging the side of the platen for at least one complete rotation to cause the folding of the material in its natural creases against the side of the platen, and cutting means for trimming the folded edge of the sheet against the platen.

In testimony, that we claim the foregoing, we have hereunto set our hands this 22nd day of May 1911.

LOUIS F. BRASCH.
ARTHUR C. TEANY.

Witnesses:
WM. H. CAMFIELD,
M. A. JOHNSON.